United States Patent
Suraparaju (10) Patent No.: US 10,764,325 B2
(45) Date of Patent: Sep. 1, 2020

(54) METHOD FOR ADJUSTING MINING DIFFICULTY OF A CRYPTOCURRENCY BLOCKCHAIN SYSTEM BY MONITORING MALICIOUS FORKS AND IMPLEMENTING A MINERS BLOCKCHAIN

(71) Applicant: KONICA MINOLTA LABORATORY U.S.A., INC., San Mateo, CA (US)

(72) Inventor: Rahul Suraparaju, Fremont, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 190 days.

(21) Appl. No.: 15/942,331

(22) Filed: Mar. 30, 2018

(65) Prior Publication Data

US 2019/0306190 A1 Oct. 3, 2019

(51) Int. Cl.
| | |
|---|---|
| G06F 21/00 | (2013.01) |
| H04L 29/06 | (2006.01) |
| G06Q 20/06 | (2012.01) |
| H04L 9/32 | (2006.01) |
| H04L 9/06 | (2006.01) |

(Continued)

(52) U.S. Cl.
CPC .......... *H04L 63/1466* (2013.01); *G06F 21/60* (2013.01); *G06F 21/602* (2013.01); *G06F 21/64* (2013.01); *G06Q 20/0658* (2013.01); *H04L 9/0637* (2013.01); *H04L 9/3242* (2013.01); *G06Q 2220/00* (2013.01); *H04L 67/12* (2013.01)

(58) Field of Classification Search
CPC .......... G06F 21/30; G06F 21/31; G06F 21/32; G06F 21/33; G06F 21/40; G06F 21/60; G06F 21/602; G06F 21/604; G06F 21/64; G06F 21/645; H04L 9/006; H04L 9/0861; H04L 9/0866
See application file for complete search history.

(56) References Cited

U.S. PATENT DOCUMENTS

| 9,875,510 B1 * | 1/2018 | Kasper | G06Q 40/12 |
| 2018/0089683 A1 * | 3/2018 | Setty | H04L 63/12 |

OTHER PUBLICATIONS

Vakamoto, "Bitcoin: A Peer-to-Peer Electronic Cash System", Bitcoin.org, https://bitcoin.org/bitcoin.pdf, 2008.

(Continued)

*Primary Examiner* — Edward Zee
(74) *Attorney, Agent, or Firm* — Chen Yoshimura LLP (57) ABSTRACT

A modified mining algorithm of the conventional bitcoin system adopts, during some periods of time, a lower difficulty for proof-of-work (PoW) than the default difficulty of the conventional bitcoin system, while implementing a malicious fork detection mechanism to monitor the bitcoin blockchain during periods of reduced difficulty. The malicious fork detection mechanism detects and removes malicious forks, the malicious forks being recognizes where every block on a forked branch was generated by the same miner. If a malicious fork is found, the mining difficulty is increased back to the default value for a period of time. The default difficulty corresponds to 2016 blocks every 14 days, while the reduced difficulty corresponds to 2016 blocks every 10 days. A miners' blockchain is implemented to allow the miners to reach consensus regarding the detection of malicious forks.

17 Claims, 3 Drawing Sheets

(51) Int. Cl.
 *G06F 21/60* (2013.01)
 *G06F 21/64* (2013.01)
 *H04L 29/08* (2006.01)

(56) References Cited

OTHER PUBLICATIONS

Kovary et al., "Technical Details", Blockchain, http://www.doc.ic.ac.uk/~ma7614/topics_website/tech.html, 8 pages, printed from the Internet on Mar. 6, 2018.

Decent, "Blockchain Architecture", Pluralsight, https://www.pluralsight.com/guides/blockchain-architecture, 12 pages, printed from the Internet on Mar. 6, 2018.

\* cited by examiner

METHOD FOR ADJUSTING MINING DIFFICULTY OF A CRYPTOCURRENCY BLOCKCHAIN SYSTEM BY MONITORING MALICIOUS FORKS AND IMPLEMENTING A MINERS BLOCKCHAIN

BACKGROUND OF THE INVENTION

Field of the Invention

This invention relates to blockchain technologies and cryptocurrencies, and in particular, it relates to a method of adjusting minting difficulty level of the cryptocurrency system.

Description of Related Art

Bitcoin is a decentralized cryptocurrency based on the blockchain technology. Bitcoin transaction information is recorded in blocks that are linked (by storing in the current block a hash of the immediate previous block) to form a chain of blocks (a blockchain). The system relies on an open network of nodes (referred to as miners, each node including processing hardware executing the bitcoin mining software/firmware), each node (miner) keeping a version of the blockchain and attempting to add blocks to the longest chain of the blockchain. The bitcoin system uses a proof-of-work (PoW) scheme such that for a block generated by a miner to be valid and hence accepted by other miners and added to the chain, the block must meet certain PoW requirements. More particularly, the miner must find a value (called a nonce) such that the hash (e.g. SHA-256 hash) of the block containing that nonce meets a certain numerical requirement. For example, the hash must be lower than or equal to a pre-defined value referred to as the difficulty target. Finding a suitable nonce for a block that meets the difficulty target is difficult because it requires a certain amount of CPU power, but the validity of a block can be easily verified by other miners. Any blocks that do not meet the required difficulty target will be rejected by other miners and will not be incorporated into the chain of blocks. A miner is rewarded each time it generates a valid block. The process is referred to as mining. When the majority of the miners are honest, the longest chain, which has the greatest amount of proof-of-work effort invested in it, represents the consensus of the majority as to the content of the transactions being recorded.

A description of the bitcoin system is presented in a paper entitled "Bitcoin: A Peer-to-Peer Electronic Cash System" by Satoshi Nakamoto, published in 2008. The Abstract of the paper describes: " . . . We propose a solution to the double-spending problem using a peer-to-peer network. The network timestamps transactions by hashing them into an ongoing chain of hash-based proof-of-work, forming a record that cannot be changed without redoing the proof-of-work. The longest chain not only serves as proof of the sequence of events witnessed, but proof that it came from the largest pool of CPU power. As long as a majority of CPU power is controlled by nodes that are not cooperating to attack the network, they'll generate the longest chain and outpace attackers. The network itself requires minimal structure. Messages are broadcast on a best effort basis, and nodes can leave and rejoin the network at will, accepting the longest proof-of-work chain as proof of what happened while they were gone."

Over time, as more miners join the bitcoin network and compete to generate valid blocks, the average time it takes for a valid block to be generated will decrease (i.e. the rate of block generation will increase). The bitcoin system is designed so that the difficulty target is adjusted every 2016 blocks, to a value such that the previous 2016 blocks would have been generated in 14 days (i.e. an average rate of approximately one block every 10 minutes) had every miner been mining at that difficulty. This keeps the average rate of block generation approximately constant (approximately one block every 10 minutes) over time, regardless of the number of miners in the network or the speed of the processors.

This PoW scheme greatly reduces the probability of successful attacks on the blockchain, the attack being malicious miners attempting to generate valid blocks with fabricated transaction data and to have the malicious blocks being accepted as a part of the longest chain. However, it also limits the capacity of the bitcoin blockchain (i.e. the amount of transaction data that can be recorded per unit time). Another consequence of high difficulty is that it increases the amount of energy consumption per block generated.

Software code that implement the bitcoin system is available as open-source software. A large amount of literature is also available that describes the bitcoin system and more generally the blockchain technology.

SUMMARY

The present invention is directed to a cryptocurrency mining method and related cryptocurrency network structure that substantially obviate one or more of the problems due to limitations and disadvantages of the related art.

An object of the present invention is to provide a cryptocurrency mining method that increases the data recording capacity of the cryptocurrency system.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a cryptocurrency mining method implemented in a cryptocurrency miner, the miner comprising processing hardware executing computer-usable programs, the miner being connected to a plurality of other minders by a cryptocurrency network, the method including: (a) storing a copy of a cryptocurrency main blockchain, the main blockchain containing a plurality of blocks linked to one another forming a chain, each block containing cryptocurrency transaction data and a hash of its immediate previous block; (b) storing a copy of a miners' blockchain, the miners' blockchain containing a plurality of FeedBlocks linked to one another forming a chain, the miners' blockchain being separate from the main blockchain, each FeedBlock of the miners' blockchain containing a timestamp, a hash of an immediate previous FeedBlock on the miners' blockchain, an address of a last-checked-for-fork block on the main blockchain which is a latest block on the main blockchain at a time the FeedBlock was created, a reduced mining difficulty index, a malicious-fork-detected flag which is a true/false flag that indicates whether a malicious fork has been detected, and a hash of the FeedBlock which is a hash of all contents of the FeedBlock except the timestamp; (c) performing mining operation using the reduced mining difficulty index to add blocks to the main blockchain; (d) after adding a predefined number of blocks to the main blockchain, performing a malicious fork detection process which includes: (d1) obtaining the address of the last-checked-for-fork block on the main blockchain from the last FeedBlock; (d2) detecting any malicious fork in the main blockchain that forks at or after the last-checked-for-fork block, a malicious fork being a forked branch of the main blockchain where all blocks in the branch were generated by a same miner; and (d3) adding a new FeedBlock to the miners' blockchain, the new FeedBlock containing a timestamp, a hash of an immediate previous FeedBlock on the miners' blockchain, an address of a last-checked-for-fork block on the main blockchain which is a latest block on the main blockchain at a time the new FeedBlock is created, a reduced mining difficulty index, a malicious-fork-detected flag which is a true/false flag that indicates whether a malicious fork has been detected in step (d2), and a hash of the new FeedBlock which is a hash of all contents of the new FeedBlock except the timestamp; (e) in response to no malicious fork being detected in the malicious fork detection process in step (d), repeating steps (c) and (d); and (f) in response to a malicious fork being detected in the malicious fork detection process in step (d): (f1) severing the malicious fork from the main blockchain; (f2) thereafter, for a pre-defined time period, performing mining operation using a default mining difficulty index to add blocks to the main blockchain, without performing the malicious fork detection process, the default mining difficulty index being more difficult than the reduced mining difficulty index; and (f3) after the predefined time period, repeating steps (c) and (d).

In some embodiments, the cryptocurrency is bitcoin, the reduced mining difficulty index corresponds to generating 2016 blocks in 10 days, the default mining difficulty index corresponds to generating 2016 blocks in 14 days, the predetermined number of blocks in step (d) is five blocks, and the predefined time period is 1 day.

Preferably, step (d3) uses a consensus mechanism which includes: generating the new FeedBlock; broadcasting the new FeedBlock to other miners connected to the cryptocurrency network; receiving a plurality of new FeedBlocks each generated by another miner; validating the new FeedBlocks received from the other miners; choosing a new FeedBlock that has an earliest timestamp and a lowest address of the miner that generated the new FeedBlock among multiple new FeedBlocks having a same timestamp; and adding the chosen new FeedBlock to the miners' blockchain.

In another aspect, the present invention provides a cryptocurrency mining method implemented in a cryptocurrency miner, the miner comprising processing hardware executing computer-usable programs, the miner being connected to a plurality of other minders by a cryptocurrency network, the method including: (a) storing a copy of a cryptocurrency blockchain, the cryptocurrency blockchain containing a plurality of blocks linked to one another forming a chain, each block containing cryptocurrency transaction data and a hash of its immediate previous block; (b) performing mining operation using a first mining difficulty index to add blocks to the cryptocurrency blockchain; (c) after adding a predefined number of blocks to the cryptocurrency blockchain, detecting any malicious fork in the cryptocurrency blockchain that forks at any one of the predefined number of blocks previous to a last block on the cryptocurrency blockchain, a malicious fork being a forked branch of the cryptocurrency blockchain where all blocks in the branch were generated by a same miner, and reaching a consensus with other miners regarding whether any malicious fork in the cryptocurrency blockchain has been detected; and (d) in response to the consensus that no malicious fork is detected in the malicious fork detection process in step (c), repeating steps (b) and (c); and (e) in response to the consensus that a malicious fork is detected in the malicious fork detection process in step (c): (e1) severing the malicious fork from the cryptocurrency blockchain; (e2) thereafter, for a predefined time period, performing mining operation using a second mining difficulty index to add blocks to the main blockchain, without performing the malicious fork detection process, the second mining difficulty index being more difficult than the first mining difficulty index; and (e3) after the predefined time period, repeating steps (b) and (c).

Preferably, in step (c), the step of reaching a consensus includes using a miners' blockchain which is separate from the cryptocurrency blockchain.

In another aspect, the present invention provides a computer program product comprising a computer usable non-transitory medium (e.g. memory or storage device) having a computer readable program code embedded therein for controlling a computer, the computer readable program code configured to cause the computer to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

The descriptions below use bitcoin as an example of a cryptocurrency, but the method according to embodiments of the present invention may be applied to other cryptocurrencies as well.

As discussed above, bitcoin mining is an important and integral part of the bitcoin system. While this collective process by the set of miners keeps the bitcoin network stable, safe and secure, the mining algorithm, which increases the difficulty over time to keep the average rate of block generation at one block every 10 minutes, has drawbacks. First, because the difficulty is adjusted according to the rate of generation of blocks, it does not factor in the energy costs incurred by miners producing the blocks. Second, it limits the amount of data that can be recorded by the bitcoin blockchain.

Figure 1:
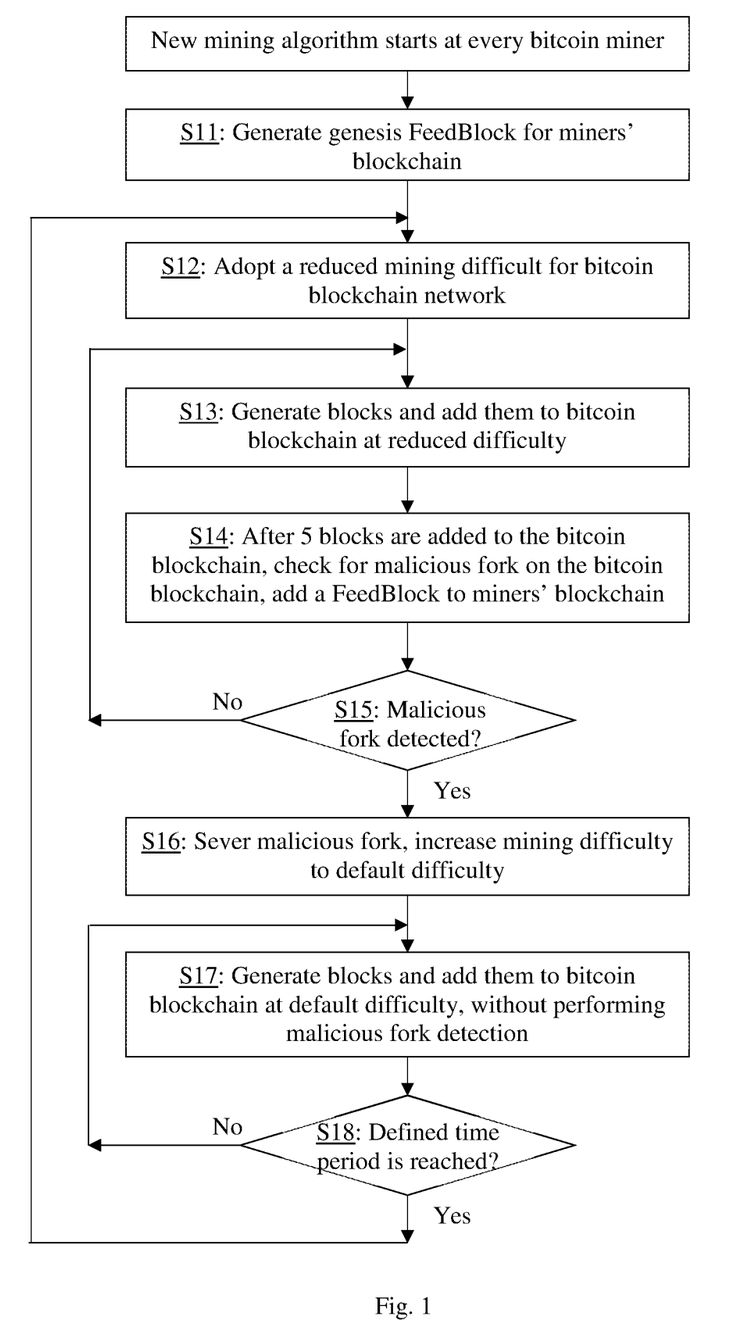
FIGS. 1, 2 and 3 are flowcharts that schematically illustrate a cryptocurrency mining method according to embodiments of the present invention.

Embodiments of the present invention modifies the mining algorithm of the conventional bitcoin system, by adopting a lower difficulty for proof-of-work (PoW) during some periods of time, while implementing a malicious fork detection mechanism to monitor the bitcoin blockchain during periods of reduced difficulty. The malicious fork detection mechanism detects and removes malicious forks that may have forked from the longest chain of the blockchain, during the time the difficulty was reduced. If a malicious fork has been found, the difficulty is increased back to the default value, which is preferably the value defined in the conventional bitcoin system (i.e. corresponding to an average of one block every 10 minutes). In other words, the difficulty used in the modified mining algorithm is adaptive and bounces between the reduced difficulty and the default difficulty, while the network looks for any security vulnerabilities during the time period of reduced difficulty. This process is illustrated in FIG. 1, described in more detail below.

In the modified bitcoin mining algorithm according to embodiments of the present invention, the mining difficulty is temporarily reduced to a level below the difficulty of the conventional bitcoin network. In this disclosure, the mining difficulty is expressed as a difficulty index which is a relative value proportional to the average amount of time it takes to generate a block. The difficulty index of the conventional bitcoin network corresponds to 2016 blocks being generated in approximately 14 days (i.e. an average of approximately one block every 10 minutes). In one embodiment, the reduced mining difficulty index corresponds to 2016 blocks being generated in approximately 10 days (i.e. an average of approximately one block every 7 minutes). More specifically, the following equation may be used to calculate the reduced difficult index based on recent performance of the network:

New difficulty index=current difficulty index*(10 days/actual time in days for generating the last 2016 blocks)

where the actual time for generating the last 2016 blocks is based on the timestamp difference between the current block and the 2016-th previous block. In other embodiments, the reduced mining difficulty index may be other values (e.g., 2016 blocks every 7 days, etc.). The decrease of the mining difficulty is implemented by modifying (increasing) the difficulty target value, i.e. the upper bound of the hash of the blocks. The algorithm for calculating the difficulty target is the same as in the conventional bitcoin mining algorithm except that the length of time for generating 2016 blocks is now 10 days instead of 14 days.

The malicious fork detection method is based on the principle that if all blocks on a forked branch of the blockchain are generated by the same miner, they are likely to be the result of an attack on the system. In an attack, the attacker (malicious miner) selects a block in the blockchain, e.g. a few blocks away from last block, and hopes to re-do all hash work done by other genuine miners to catch up to the longest chain, taking advantage of the lowered difficulty. Thus, in embodiments of the present invention, a malicious fork is recognized and distinguished from a genuine fork based on the characteristic that all blocks in the malicious forked branch are generated by the same miner, while blocks in a genuine forked are generated by a mixture of different miners. Note that the attacker's selected block is likely to be no more a few blocks back from the last block, because the probability of success of a malicious fork attempt diminishes rapidly as the distance of the selected block from the last block increases.

The malicious fork detection step is performed by all of the miners, and performed repeatedly and periodically while the mining difficulty is reduced from the default difficulty. An out-of-band blockchain, referred to as the miners' blockchain in this disclosure, is implemented to collect predefined sets of data records related to the detection of malicious forks on the bitcoin blockchain. Blocks on the miners' blockchain are referred to as FeedBlocks in this disclosure. The miners' blockchain is separate from and independent of the bitcoin blockchain (which is referred to as the main blockchain in this disclosure to distinguish it from the miners' blockchain). Only miners, and preferably all miners, are participants to read/write into the miners' blockchain.

Each FeedBlock in the miners' blockchain stores the following items: a timestamp, the hash of the immediate previous FeedBlock on the miners' blockchain, the address of the latest block on the bitcoin blockchain at that time (this address field is tagged with "last-checked-for-fork"), the current reduced mining difficulty index, a true/false flag that indicates whether a malicious fork has been detected (the "malicious-fork-detected" flag), the address of the found malicious miner (if any), and a hash of the FeedBlock which hashes all fields of the FeedBlock except the timestamp. The FeedBlock may also contain the addresses of the blocks of the main blockchain where the malicious fork is detected.

The details of the modified bitcoin mining algorithm according to embodiments of the present invention, which includes the adjustment of mining difficulty index and detection of malicious forks, are explained below with reference to FIG. 1.

The modified mining algorithm is implemented in an existing bitcoin network that has already been in operation. The existing bitcoin network uses the default mining difficulty and does not have an out-of-band miners' blockchain. The software that implement the modified mining algorithm is distributed to the miners, and all miners synchronize to start the algorithm at approximately the same time, using a predefined set time based on Network Time Protocol (NTP).

Figure 2:
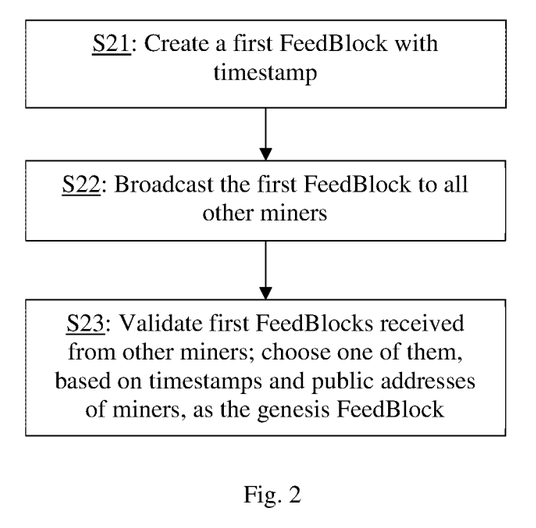

First, the network creates the genesis FeedBlock, i.e. the first FeedBlock on miners' blockchain (step S11). As shown in FIG. 2, the creation of the genesis FeedBlock (step S11) includes the following steps. At the algorithm starting time, each of the miners in the blockchain network generates a first FeedBlock (step S21). Each miner broadcasts the first FeedBlock it created to all other miners (step S22). From all of the first FeedBlocks, each miner chooses one and only one such FeedBlock as the genesis FeedBlock of the miners' blockchain based on the following: based on the timestamp field of the FeedBlocks, the earliest generated FeedBlock is chosen; if two or more FeedBlocks contain the same earliest timestamp, the FeedBlock generated by a miner having the lowest public address value is chosen (step S23).

Figure 3:
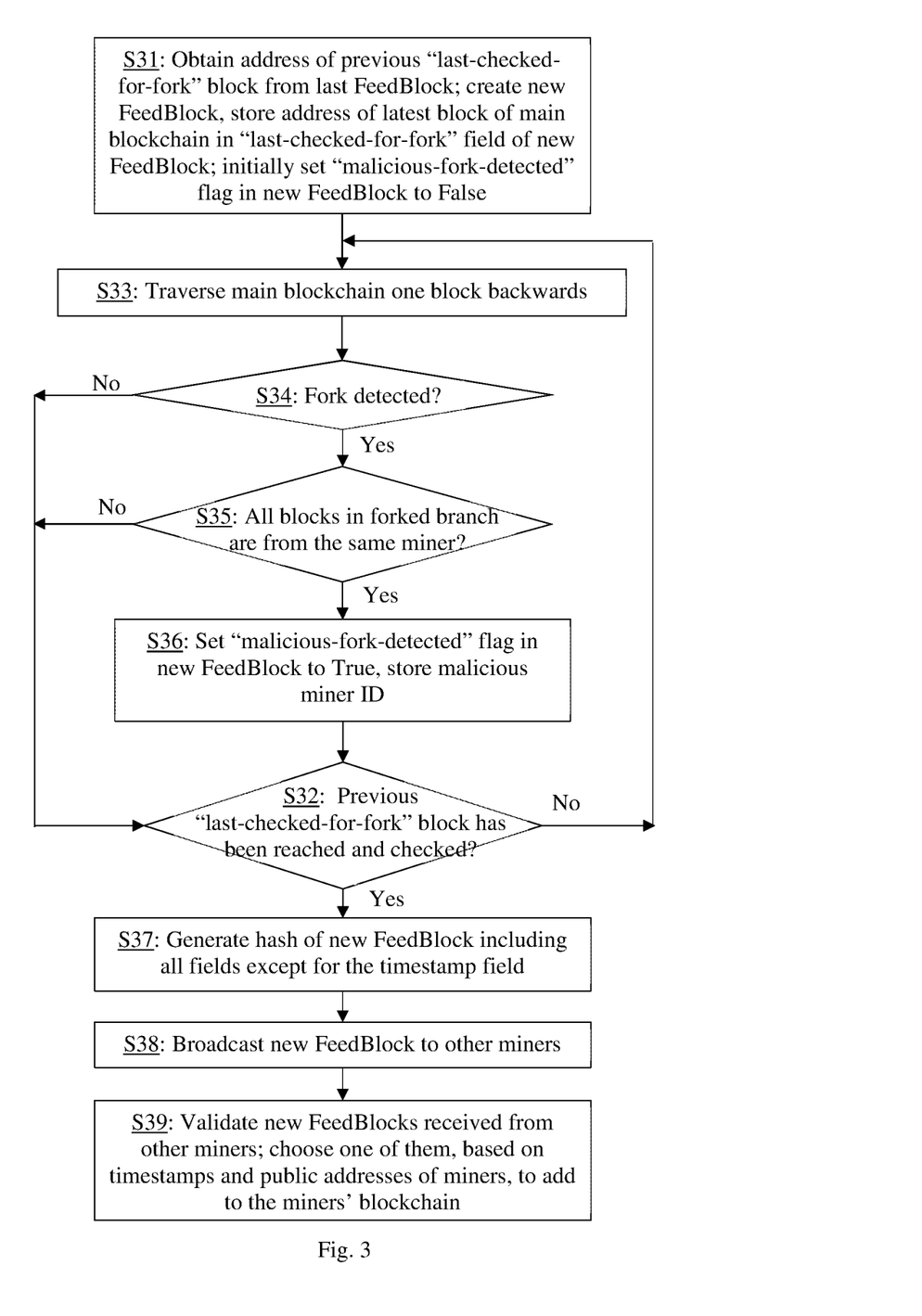

At this time, the mining difficulty of the bitcoin network is reduced from the default difficulty to a reduced difficulty, for example to a reduced difficulty index that corresponds to 2016 blocks being generated every 10 days (step S12). After this time, the miners perform bitcoin mining operation to add blocks to the bitcoin blockchain in the conventional manner but at the reduced difficulty (step S13). More specifically, the mining operation includes: obtaining bitcoin transactions from the network; attempting to find a nonce and generate a block that meets the reduced difficulty; when such a nonce is found, generating a block and broadcasting it to other miners; when, before such a nonce is found, a new block is received from another miner, validating the new block; adding a valid block (either generated by itself or received from another miner) to the main blockchain. Periodically, for example, after every N (N being a predefined number) blocks are added to the bitcoin blockchain, a malicious fork detection process is performed by all miners and a FeedBlock is added to the miners' blockchain (step S14). The predefined number N may be, for example, five blocks. The number five is less than six, which is the default number of confirmations required for finality of blocks in the bitcoin blockchain. The malicious fork detection process (step S14) is performed by each miner as follows (refer to FIG. 3):

The miner creates a new empty FeedBlock, obtains the latest block from the main blockchain, and stores its address into the last-checked-for-fork field of the new FeedBlock (step S31). The malicious-fork-detected flag is initially set to False in the new FeedBlock. The miner also obtains the address for the last block on the main blockchain that has been checked for malicious fork, by referring to the last-checked-for-fork field of the last FeedBlock of the miners' blockchain before the new FeedBlock (this address is referred to here as the previous last-checked-for-fork block). Starting from the latest block on the main blockchain, and until the previous last-checked-for-fork block has been reached and checked ("Yes" in step S32), the miner traverses the main blockchain backwards one block at a time (step S33). At every block, the miner checks the main blockchain for any forks at that block (step S34), and if a fork is detected ("Yes" in step S34), the miner checks if all blocks in the forked branch are from the same miner or a mix of multiple miners (step S35).

If the blocks in the forked branch are from a mix of multiple miners ("No" in step S35), or if no fork is found in step S34 ("No" in step S34), the miner traverses one more block on the main blockchain (step S33) and repeats the checking steps S34 and S35, until the previous last-checked-for-fork block is reached ("Yes" in step S32). If the previous last-checked-for-fork block is reached and no malicious fork is detected in the checking steps, the malicious-fork-detected flag in the new FeedBlock will remain False.

On the other hand, in the checking step S35, if all blocks in the forked chain are from the same miner ("Yes" if step S35), the fork is deemed a malicious fork and the miner sets the malicious-fork-detected flag in the new FeedBlock to True (step S36). The miner then continues to check the next block on the main blockchain until the previous last-checked-for-fork block has been reached and checked ("Yes" in step S32).

Thereafter, the miner calculates a hash of the new FeedBlock, where the hash is calculated by hashing all fields of the new FeedBlock except for the timestamp field (step S37).

Note that as an alternative to obtaining the previous last-checked-for-fork field from the last FeedBlock and use it for step S32, the miner may start from the latest block on the main blockchain and traverse the chain for the pre-defined number (N) of blocks, in which case step S32 determines whether the predefined number of previous blocks have all been checked. Because N blocks have been added since the last detection process, the effect is that all previously unchecked blocks are now checked.

Every miner broadcasts the new FeedBlock it generated to every other miner (step S38). Each miner, after receiving the new FeedBlock from the other miners, validates the hash of each new FeedBlock received from other miners (if the hash is equal to the hash of the new FeedBlock generated by the miner itself, it indicates that the other miner reached the same detection result as the miner itself), and chooses one of the new FeedBlocks and adds it to the miners' blockchain based on the timestamps and the public addresses of the miners that generated the new FeedBlocks (step S39). The consensus algorithm for choosing the one FeedBlock to add to the miners' blockchain is the same as that for choosing the genesis FeedBlock (step S23 in FIG. 2) described earlier. I.e., the new FeedBlock that has the earliest timestamp is chosen; if two or more new FeedBlocks has the same earliest timestamp, the one generated by the miner having the lowest public address value is chosen. This completes step S14 in FIG. 1. The newly added FeedBlock extends the miners' blockchain by being linked to the previous last block of the miners' blockchain, as the newly added block contains the hash of the previous last block.

Referring back to FIG. 1, if no malicious fork is detected in the checking process of step S14 ("No" in step S15), the miners continue to perform mining operation at the reduced difficulty (step S13), and continue to check for malicious forks after every five blocks are added to the main blockchain (step S14).

If, on the other hand, a malicious fork is detected in the checking process of step S14 ("Yes" in step S15), each miner disjoins (i.e., severs, or deletes) the detected malicious forked branch from the main blockchain, and increases the mining difficulty for the bitcoin network to the default difficulty, i.e. a difficulty that corresponds to 2016 blocks being generated every 14 days (step S16). The miners will perform mining operation at the default difficulty for a period of time (step S17); during the time that the mining difficulty is at the default difficulty, the malicious fork detection process (step S14) is not performed.

After a predefined period of time ("Yes" in step S18), for example, after successful creation of 144 blocks on the main blockchain, i.e. approximately one day at the default difficulty of approximately one block per 10 minutes, the difficulty index is reduced again and all minors start to perform mining operation at the reduced difficulty.

It is noted that the malicious fork monitoring process described above is designed to detect malicious attack as applied to the forking process of the main blockchain, e.g. when attackers try to steer away the longest chain. On the longest chain itself, every block in the needs six or more confirmations (i.e. six newer blocks to be created) for declaring the finality of the transactions residing in such a block.

Figure 4:
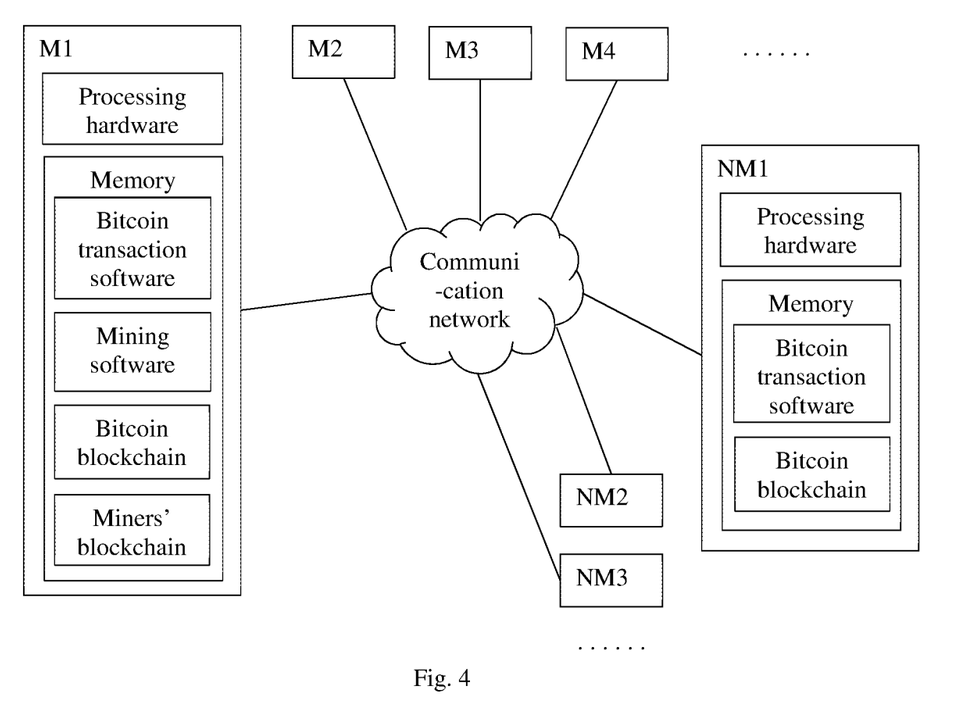
FIG. 4 schematically illustrates a cryptocurrency network according to embodiments of the present invention.

FIG. 4 schematically illustrates the structure of a bitcoin network (or more generally, a cryptocurrency network) implementing embodiments of the present invention. As shown in FIG. 4, the bitcoin network includes a plurality of mining nodes or miners, M1, M2, M3, N4, . . . , connected to each other via a communication network schematically illustrated as a cloud. Each miner includes processing hardware (processor, FPGA, etc.), and a memory which stores software, including bitcoin transaction software (software that facilitates transactions in bitcoin), the bitcoin mining software, the bitcoin blockchain, and the out-of-band miners' blockchain (the FeedBlock chain) (the details are illustrated in FIG. 4 only for miner M1). Each miner performs bitcoin mining operation described above. A new miner may join the network by obtaining a copy of the current miners' blockchain, in addition to a copy of the current main blockchain.

As shown in FIG. 4, the bitcoin network also includes a plurality of bitcoin transaction users, or non-miner users, NM1, NM2, NM3, . . . , who transact bitcoin transactions using the network. These bitcoin transactions are recorded in the bitcoin blockchain by the mining operation of the miners. Each non-miner user also includes processing hardware and a memory which may store bitcoin transaction software and a copy of the bitcoin blockchain, but they do not perform bitcoin mining and do not maintain the miners' blockchain.

Advantages of the modified bitcoin system described above have the following advantages. The reduced difficulty achieves an overall increased mining capacity while maintaining the security of the system. The reduced difficulty also reduces the energy consumption per block to $5/7$ of that of the conventional bitcoin system. This modified system offers a better balance between security and capacity. Its injects some degree of the increased mining capacity that can be achieved, reduces the difficulty into PoW mining such that the consensus is achieved in a balanced fashion with reasonably stable, secure and safe bitcoin system while fostering better mining efficiency and capacity.

As pointed out earlier, the descriptions in this disclosure use bitcoin as an example of a cryptocurrency, but the method according to embodiments of the present invention may be applied to other cryptocurrencies.

It will be apparent to those skilled in the art that various modification and variations can be made in the modified bitcoin mining method and bitcoin system structure of the present invention without departing from the spirit or scope of the invention. Thus, it is intended that the present invention cover modifications and variations that come within the scope of the appended claims and their equivalents.

What is claimed is:

1. A cryptocurrency mining method implemented in a cryptocurrency miner, the miner comprising processing hardware executing computer-usable programs, the miner being connected to a plurality of other miners by a cryptocurrency network, the method comprising:
   (a) storing a copy of a cryptocurrency main blockchain, the main blockchain containing a plurality of blocks linked to one another forming a chain, each block containing cryptocurrency transaction data and a hash of its immediate previous block;
   (b) storing a copy of a miners' blockchain, the miners' blockchain containing a plurality of FeedBlocks linked to one another forming a chain, the miners' blockchain being separate from the main blockchain, each FeedBlock of the miners' blockchain containing a timestamp, a hash of an immediate previous FeedBlock on the miners' blockchain, an address of a last-checked-for-fork block on the main blockchain which is a latest block on the main blockchain at a time the FeedBlock was created, a reduced mining difficulty index, a malicious-fork-detected flag which is a true/false flag that indicates whether a malicious fork has been detected, and a hash of the FeedBlock which is a hash of all contents of the FeedBlock except the timestamp;
   (c) performing mining operation using the reduced mining difficulty index to add blocks to the main blockchain;
   (d) after adding a predefined number of blocks to the main blockchain, performing a malicious fork detection process which includes:
      (d1) obtaining the address of the last-checked-for-fork block on the main blockchain from the last FeedBlock;
      (d2) detecting any malicious fork in the main blockchain that forks at or after the last-checked-for-fork block, a malicious fork being a forked branch of the main blockchain where all blocks in the branch were generated by a same miner; and
      (d3) adding a new FeedBlock to the miners' blockchain, the new FeedBlock containing a timestamp, a hash of an immediate previous FeedBlock on the miners' blockchain, an address of a last-checked-for-fork block on the main blockchain which is a latest block on the main blockchain at a time the new FeedBlock is created, the reduced mining difficulty index, a malicious-fork-detected flag which is a true/false flag that indicates whether a malicious fork has been detected in step (d2), and a hash of the new FeedBlock which is a hash of all contents of the new FeedBlock except the timestamp;
   (e) in response to no malicious fork being detected in the malicious fork detection process in step (d), repeating steps (c) and (d); and
   (f) in response to a malicious fork being detected in the malicious fork detection process in step (d):
      (f1) severing the malicious fork from the main blockchain;
      (f2) thereafter, for a predefined time period, performing mining operation using a default mining difficulty index to add blocks to the main blockchain, without performing the malicious fork detection process, the default mining difficulty index being more difficult than the reduced mining difficulty index; and
      (f3) after the predefined time period, repeating steps (c) and (d).

2. The cryptocurrency mining method of claim 1, wherein the cryptocurrency is bitcoin.

3. The cryptocurrency mining method of claim 2, wherein the reduced mining difficulty index corresponds to generating 2016 blocks in 10 days, and the default mining difficulty index corresponds to generating 2016 blocks in 14 days.

4. The cryptocurrency mining method of claim 2, wherein the predefined number of blocks in step (d) is five blocks.

5. The cryptocurrency mining method of claim 2, wherein the predefined time period is 1 day.

6. The cryptocurrency mining method of claim 1, wherein step (d2) comprises:
   starting at the latest block on the main blockchain, traversing the main blockchain one block at a time;
   at each block of the traversal, detecting whether a forked branch is present;
   in response to a forked branch being present, detecting whether all blocks on the forked branch were generated by the same miner; and
   in response to detecting that all blocks on the forked branch were generated by the same miner, setting the malicious-fork-detected flag in the new FeedBlock to True.

7. The cryptocurrency mining method of claim 1, wherein step (d3) includes:
   generating the new FeedBlock;
   broadcasting the new FeedBlock to other miners connected to the cryptocurrency network;
   receiving a plurality of new FeedBlocks each generated by another miner;
   validating the new FeedBlocks received from the other miners;
   choosing a new FeedBlock that has an earliest timestamp and a lowest address of the miner that generated the new FeedBlock among multiple new FeedBlocks having a same timestamp; and
   adding the chosen new FeedBlock to the miners' blockchain.

8. A cryptocurrency mining method implemented in a cryptocurrency miner, the miner comprising processing hardware executing computer-usable programs, the miner being connected to a plurality of other miners by a cryptocurrency network, the method comprising:
   (a) storing a copy of a cryptocurrency blockchain, the cryptocurrency blockchain containing a plurality of blocks linked to one another forming a chain, each block containing cryptocurrency transaction data and a hash of its immediate previous block;
   (b) performing mining operation using a first mining difficulty index to add blocks to the cryptocurrency blockchain;
   (c) after adding a predefined number of blocks to the cryptocurrency blockchain, detecting any malicious fork in the cryptocurrency blockchain that forks at any one of the predefined number of blocks previous to a last block on the cryptocurrency blockchain, a malicious fork being a forked branch of the cryptocurrency blockchain where all blocks in the branch were generated by a same miner, and reaching a consensus with other miners regarding whether any malicious fork in the cryptocurrency blockchain has been detected; and (d) in response to the consensus that no malicious fork is detected in the malicious fork detection process in step (c), repeating steps (b) and (c); and (e) in response to the consensus that a malicious fork is detected in the malicious fork detection process in step (c):

(e1) severing the malicious fork from the cryptocurrency blockchain;

(e2) thereafter, for a predefined time period, performing mining operation using a second mining difficulty index to add blocks to the cryptocurrency blockchain, without performing the malicious fork detection process, the second mining difficulty index being more difficult than the first mining difficulty index; and (e3) after the predefined time period, repeating steps (b) and (c).

9. The cryptocurrency mining method of claim 8, wherein in step (c), the step of reaching a consensus includes using a miners' blockchain which is separate from the cryptocurrency blockchain.

10. The cryptocurrency mining method of claim 8, wherein the cryptocurrency is bitcoin, wherein the first mining difficulty index corresponds to generating 2016 blocks in 10 days, and the second mining difficulty index corresponds to generating 2016 blocks in 14 days, wherein the predefined number of blocks in step (d) is five blocks, and wherein the predefined time period is 1 day.

11. A computer program product comprising a non-transitory computer readable storage medium having a computer readable program code embedded therein for controlling a computer, the computer being connected to a plurality of other computers by a cryptocurrency network, the computer readable program code configured to cause the computer to execute a cryptocurrency mining to:

(a) obtain a copy of a cryptocurrency main blockchain, the main blockchain containing a plurality of blocks linked to one another forming a chain, each block containing cryptocurrency transaction data and a hash of its immediate previous block;

(b) obtain a copy of a miners' blockchain, the miners' blockchain containing a plurality of FeedBlocks linked to one another forming a chain, the miners' blockchain being separate from the main blockchain, each FeedBlock of the miners' blockchain containing a timestamp, a hash of an immediate previous FeedBlock on the miners' blockchain, an address of a last-checked-for-fork block on the main blockchain which is a latest block on the main blockchain at a time the FeedBlock was created, the reduced mining difficulty index, a malicious-fork-detected flag which is a true/false flag that indicates whether a malicious fork has been detected, and a hash of the FeedBlock which is a hash of all contents of the FeedBlock except the timestamp;

(c) perform mining operation using the reduced mining difficulty index to add blocks to the main blockchain;

(d) after adding a predefined number of blocks to the main blockchain, perform a malicious fork detection process to:

(d1) obtain the address of the last-checked-for-fork block on the main blockchain from the last FeedBlock;

(d2) detect any malicious fork in the main blockchain that forks at or after the last-checked-for-fork block, a malicious fork being a forked branch of the main blockchain where all blocks in the branch were generated by a same miner; and (d3) add a new FeedBlock to the miners' blockchain, the new FeedBlock containing a timestamp, a hash of an immediate previous FeedBlock on the miners' blockchain, an address of a last-checked-for-fork block on the main blockchain which is a latest block on the main blockchain at a time the new FeedBlock is created, a reduced mining difficulty index, a malicious-fork-detected flag which is a true/false flag that indicates whether a malicious fork has been detected in step (d2), and a hash of the new FeedBlock which is a hash of all contents of the new FeedBlock except the timestamp;

(e) in response to no malicious fork being detected in the malicious fork detection process in step (d), repeat steps (c) and (d); and (f) in response to a malicious fork being detected in the malicious fork detection process in step (d):

(f1) sever the malicious fork from the main blockchain;

(f2) thereafter, for a predefined time period, perform mining operation using a default mining difficulty index to add blocks to the main blockchain, without performing the malicious fork detection process, the default mining difficulty index being more difficult than the reduced mining difficulty index; and (f3) after the predefined time period, repeat steps (c) and (d).

12. The computer program product of claim 11, wherein the cryptocurrency is bitcoin.

13. The computer program product of claim 12, wherein the reduced mining difficulty index corresponds to generating 2016 blocks in 10 days, and the default mining difficulty index corresponds to generating 2016 blocks in 14 days.

14. The computer program product of claim 12, wherein the predefined number of blocks in step (d) is five blocks.

15. The computer program product of claim 12, wherein the predefined time period is 1 day.

16. The computer program product of claim 11, wherein step (d2) comprises:

starting at the latest block on the main blockchain, traverse the main blockchain one block at a time;

at each block of the traversal, detect whether a forked branch is present;

in response to a forked branch being present, detect whether all blocks on the forked branch were generated by the same miner; and in response to detecting that all blocks on the forked branch were generated by the same miner, set the malicious-fork-detected flag in the new FeedBlock to True.

17. The computer program product of claim 11, wherein step (d3) includes:

generate the new FeedBlock;

broadcast the new FeedBlock to other miners connected to the cryptocurrency network;

receive a plurality of new FeedBlocks each generated by another miner;

validate the new FeedBlocks received from the other miners;

choose a new FeedBlock that has an earliest timestamp and a lowest address of the miner that generated the new FeedBlock among multiple new FeedBlocks having a same timestamp; and add the chosen new FeedBlock to the miners' blockchain.

\* \* \* \* \*